(12) United States Patent
Kreiselmeier et al.

(10) Patent No.: US 7,213,973 B2
(45) Date of Patent: May 8, 2007

(54) ROLLING BEARING IN AIRCRAFT

(75) Inventors: Gerhard Kreiselmeier, Dittelbrunn (DE); Wilhelm Sebald, Bad Königshofen (DE); Franz Josef Ebert, Hammelburg (DE)

(73) Assignee: Fag Kugelfischer AG (DE)

( * ) Notice: Subject to any disclaimer, the term of this patent is extended or adjusted under 35 U.S.C. 154(b) by 162 days.

(21) Appl. No.: 10/533,043

(22) PCT Filed: Oct. 29, 2003

(86) PCT No.: PCT/DE03/03603

§ 371 (c)(1),
(2), (4) Date: May 23, 2005

(87) PCT Pub. No.: WO2004/040026

PCT Pub. Date: May 13, 2004

(65) Prior Publication Data

US 2006/0165329 A1 Jul. 27, 2006

(30) Foreign Application Priority Data

Oct. 30, 2002 (DE) ................. 102 50 459

(51) Int. Cl.
*F16C 33/58* (2006.01)
(52) U.S. Cl. ..................................... 384/450; 384/492
(58) Field of Classification Search ............... 384/492, 384/513, 569, 625, 450
See application file for complete search history.

(56) References Cited

U.S. PATENT DOCUMENTS 5,507,580 A 4/1996 Dezzani et al. ............. 384/492

*Primary Examiner*—Lenard A. Footland
(74) *Attorney, Agent, or Firm*—Ostrolenk, Faber, Gerb & Soffen, LLP

(57) ABSTRACT

A single-row or multi-row rolling bearing comprising thin-walled bearing races which are made of a martensitic, through hardened steel and have the following characteristics: a surface hardness of $\geq 613$ HV (56 HRC) in the area of the bearing face; a core hardness of $\geq 285$ HV (28 HRC); a difference of $\geq 150$ HV (9 HRc) between the surface hardness and the core hardness. The core hardness is reached at a depth ranging between 8 percent of the diameter of the rolling elements and 90 percent of the wall thickness on the bottom of the track. There is a ratio of $\geq 20$ between the diameter of a pitch circle $T_k$ and the diameter of a rolling element $D_W$.

8 Claims, 2 Drawing Sheets

ROLLING BEARING IN AIRCRAFT

CROSS REFERENCE TO RELATED APPLICATION

The present application is a 35 U.S.C. §§ 371 national phase conversion of PCT/DE2003/003603 filed 29 Oct. 2003, which claims priority of German Application No. 102 50 459.8 filed 30 Oct. 2002. The PCT International Application was published in the German language.

FIELD OF THE INVENTION

The invention relates to a rolling bearing which is used in aircraft, in particular helicopters.

In aircraft, there are particular demands with regard to lightweight construction. For this reason, the rolling bearings which are used in these aircraft also have to satisfy the demands relating to lightweight construction. Given the constantly increasing demands on the performance of the rolling bearings, the problem has arisen that consequently conventional, fully hardening rolling bearing steels can no longer be used, on account of the possibility of cracks occurring under high loads.

DE 8711624 U shows a rolling bearing for aeronautical applications which satisfies the requirements for a lightweight construction yet is in a form which is very difficult to produce. Despite the complex form of this rolling bearing or of the rolling bearing races or raceways, the demands imposed with regard to the possibility of the formation of cracks being minimized are not satisfied by this embodiment.

OBJECT OF THE INVENTION

Therefore, the object is to propose a process for thin-walled rolling bearing raceways in aeronautical applications in which the risk of cracking is reduced.

DESCRIPTION OF THE INVENTION

According to the invention, the object is achieved by a single-row or multi-row rolling bearing comprising thin-walled bearing races which are made of a martensitic, through hardened steel and having the following characteristics: a surface hardness of $\geq 613$ HV (56 HRC) in the area of the bearing face; a core hardness of $\geq 285$ HV (28 HRC); a difference of $\geq 150$ HV (9HRc) between the surface hardness and the core hardness. The core hardness is reached at a depth ranging between 8 percent of the diameter of the rolling elements and 90 percent of the wall thickness on the bottom of the track. There is a ratio of $\geq 20$ between the diameter of a pitch circle $T_k$ and the diameter of a rolling element $D_w$.

The core concept of the invention consists in the raceways of the rolling bearing being surface-hardened. This surface-hardening makes it possible to considerably reduce the risk of cracking even when using thin-walled materials. The lower core hardness of the raceways prevents any cracks which may form originating in the running surfaces or in the rolling contact from propagating further.

Particularly positive properties are produced for the rings according to the invention if they have a surface hardness in the region of the raceways of $\geq 613$ HV (56 HRC) and a core hardness in the thin-walled rings of $\geq 285$ HV (28 HRC). The core hardness is reached at a depth of between 8% of the rolling body diameter and 90% of the wall thickness of the race in the race base.

In this context, raceways are described as thin-walled if the ratio of the pitch circle diameter ($T_k$) to the rolling body diameter ($D_w$) is greater than or equal to 20 ($T_k/D_w \geq 20$).

DETAILED DESCRIPTION OF THE DRAWINGS

Figure 1:
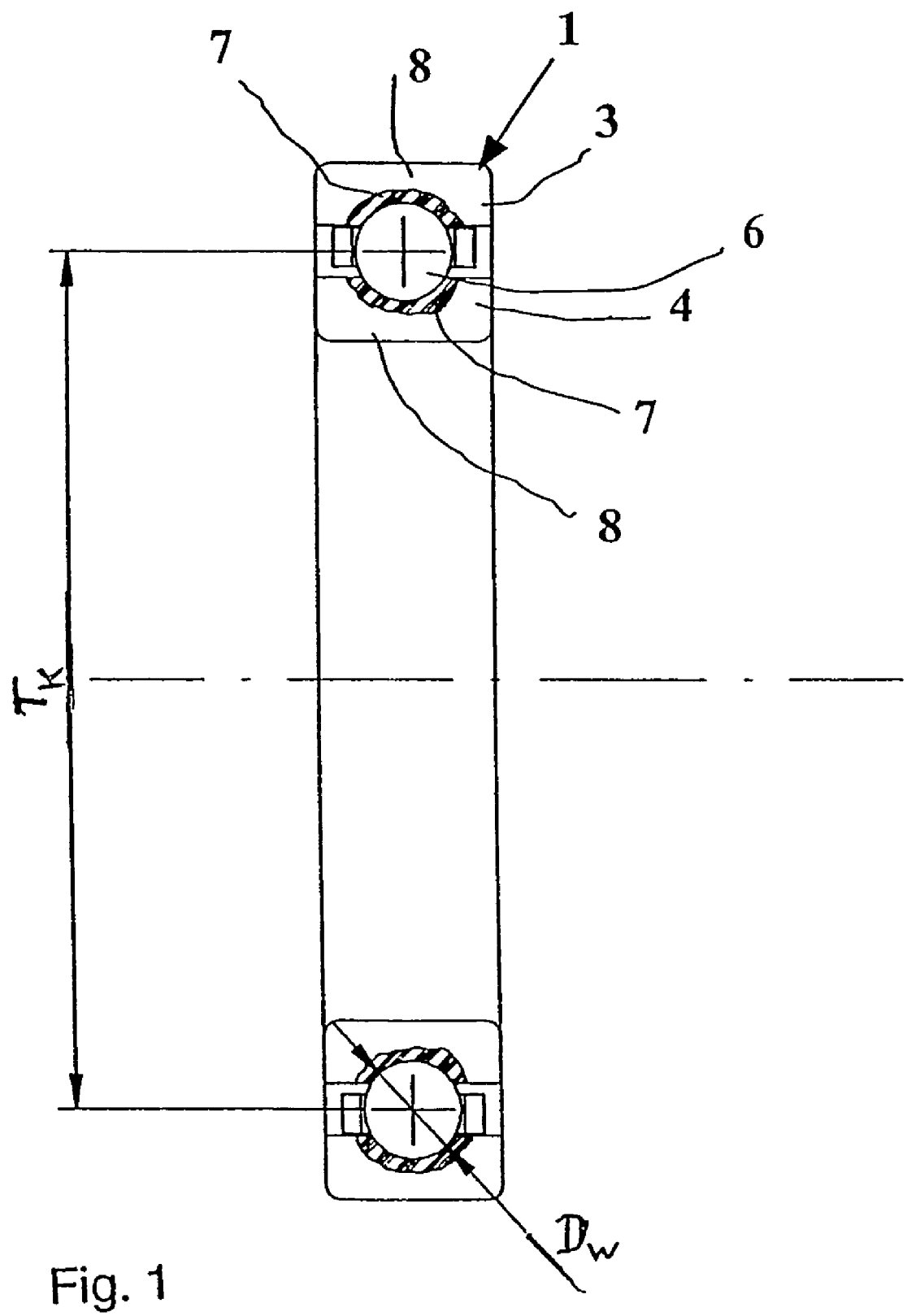
FIG. 1 shows a single-row groove ball bearing in section.

FIG. 1 shows a single-row groove ball bearing 1. The outer ring 3, the inner ring 4 and the rolling bearings 6 are illustrated. The region with the surface hardness 7 of $\geq 613$ HV is indicated in the drawing around the region of the race. The region having the core hardness 8 adjoins the region having the surface hardness 7. The location of the pitch circle diameter $T_k$ and the rolling body diameter $D_w$ are shown in the drawing. The pitch circle diameter $T_k$ is based on the center point of two opposite balls.

Figure 2:
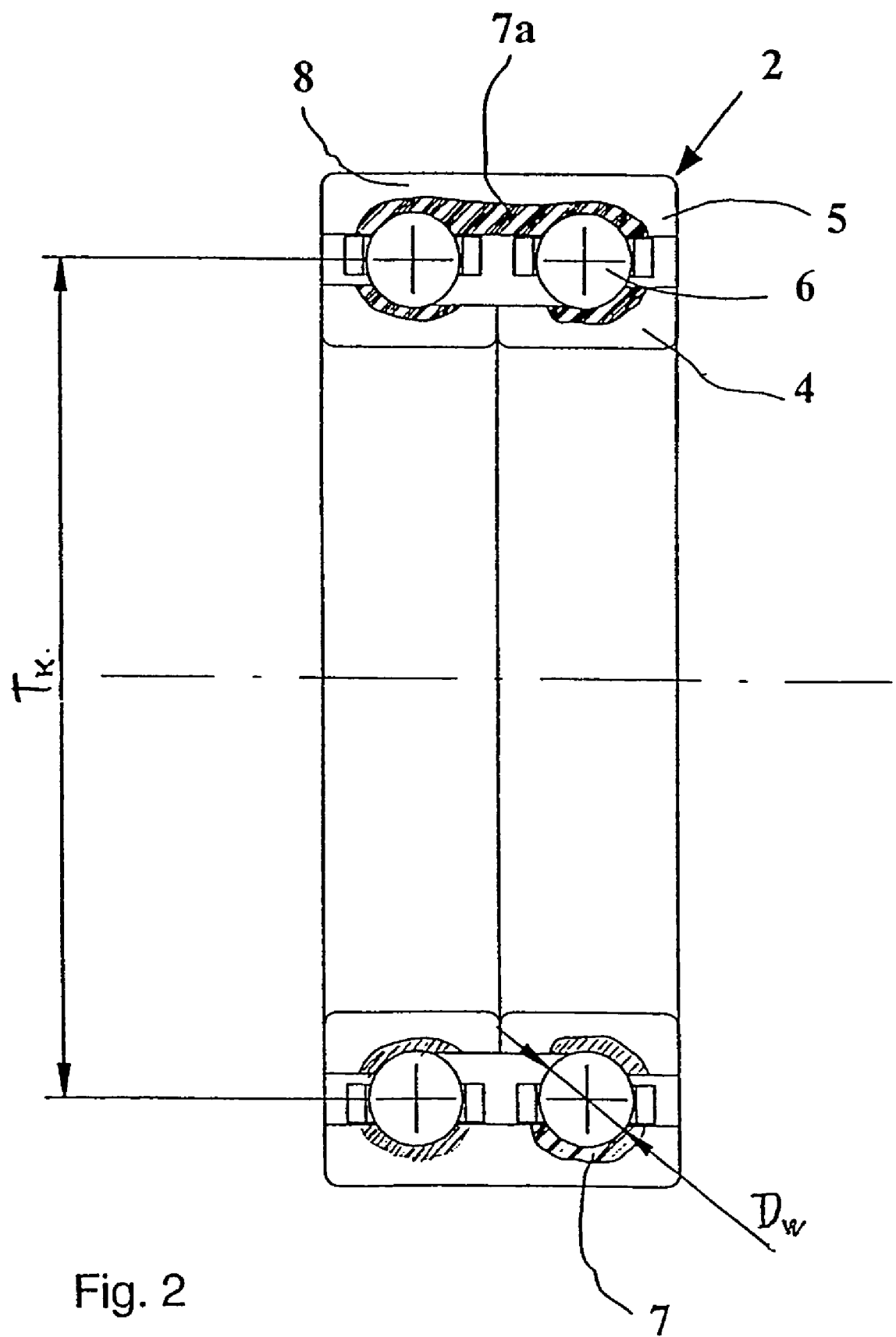
FIG. 2 shows a two-row angular ball bearing in section.

FIG. 2 illustrates a two-row rolling bearing in the form of a two-row angular ball bearing. The common outer ring 5 comprises two races in which the balls 6 roll. This two-row angular ball bearing 2 has two inner rings 4. The position of the pitch circle diameter $T_k$ and of the rolling body diameter $D_w$ are indicated similarly to in FIG. 1. The region having the surface hardness of $\geq 613$ HV is illustrated in the region of the race and of the inner ring 4 and also of the outer ring 5. The contiguous region having the surface hardness made up of two adjacent races 7a is illustrated. In components having two races, there is also the possibility of the region having the surface hardness 7 being positioned separately around the races.

The invention claimed is:

1. A single-row or multi-row rolling bearing having thin-walled races, wherein an inner and outer races each having a respective running surface for rolling bodies between the races, the races having a core region outward of the running surfaces, the races are comprised of a martensitic, through hardened steel and also having the following features:
   a surface hardness of $\geq 613$ HV (56 HRC) in the regions of the running surfaces of the race,
   a core hardness of $\geq 285$ HV (28 HRC) of the race,
   a difference ($\Delta$) between the surface hardness and the core hardness of $\geq 150$ HV (9 HRC),
   the core hardness being reached at a depth into each race of between 8% of a diameter of rolling bodies between the races and 90% of a wall thickness in a race base beneath the running surface, and
   a ratio of a pitch circle diameter $T_k$ of the bearing to the rolling body diameter Dw of $^3$ 20.

2. The rolling bearing as claimed in claim 1, wherein the hardness at a depth of 4% of the rolling body diameter Dw is at most 70 HV (4 HRC) lower than at the surface.

3. The rolling bearing as claimed in claim 1, wherein the races are of a corrosion-resistant steel.

4. The rolling bearing as claimed in claim 1, further comprising at least one of securing flanges and reinforcing elements at the races.

5. The rolling bearing as claimed in claim 1, further comprising rolling bodies between the races and rolling on the running surfaces, the rolling bodies are of through hardened, martensitic rolling bearing steel, or of surface-hardened steel, or of corrosion-resistant steel or of ceramic.

6. The rolling bearing as claimed in claim 5, further comprising rolling bodies between the races and rolling on the running surfaces, and the rolling bodies are balls.

7. The rolling bearing as claimed in claim 5, further comprising rolling bodies between the races and rolling on the running surfaces, and the rolling bodies are rollers.

8. The rolling bearing as claimed in claim 1, further comprising rolling bodies between the races and rolling on the running surfaces.

* * * * *